US012558878B2

(12) United States Patent
Gerrits et al.

(10) Patent No.: US 12,558,878 B2
(45) Date of Patent: Feb. 24, 2026

(54) BI-DIRECTIONALLY ORIENTED MULTILAYER FILM

(71) Applicant: SABIC GLOBAL TECHNOLOGIES B.V., Bergen op Zoom (NL)

(72) Inventors: Niclasina Siberta Johanna Alberdina Gerrits, Sittard (NL); Attilio Scala, Maastricht (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 341 days.

(21) Appl. No.: 18/014,792

(22) PCT Filed: Jun. 23, 2021

(86) PCT No.: PCT/EP2021/067219
§ 371 (c)(1),
(2) Date: Jan. 6, 2023

(87) PCT Pub. No.: WO2022/008252
PCT Pub. Date: Jan. 13, 2022

(65) Prior Publication Data
US 2024/0239087 A1      Jul. 18, 2024

(30) Foreign Application Priority Data
Jul. 8, 2020      (EP) ..................................... 20184713

(51) Int. Cl.
| | |
|---|---|
| *B32B 27/08* | (2006.01) |
| *B32B 27/20* | (2006.01) |
| *B32B 27/32* | (2006.01) |
| *B32B 37/00* | (2006.01) |
| *B32B 38/00* | (2006.01) |

(52) U.S. Cl.
CPC ............ *B32B 27/08* (2013.01); *B32B 27/205* (2013.01); *B32B 27/32* (2013.01); *B32B 37/156* (2013.01); *B32B 38/1875* (2013.01); *B32B 2038/0028* (2013.01); *B32B 2250/242* (2013.01); *B32B 2307/518* (2013.01); *B32B 2323/043* (2013.01); *B32B 2323/046* (2013.01); *B32B 2439/70* (2013.01)

(58) Field of Classification Search
CPC ....... B32B 27/08; B32B 27/205; B32B 27/32; B32B 37/156; B32B 38/1875; B32B 2038/0028; B32B 2250/242; B32B 2307/518; B32B 2323/043; B32B 2323/046; B32B 2439/70
See application file for complete search history.

(56) References Cited

U.S. PATENT DOCUMENTS

| | | | | | |
|---|---|---|---|---|---|
| 4,780,264 | A | * | 10/1988 | Dohrer | .................. B29C 48/022 |
| | | | | | 264/237 |
| 6,045,882 | A | * | 4/2000 | Sandford | ................ B32B 27/32 |
| | | | | | 428/218 |

FOREIGN PATENT DOCUMENTS

| | | | |
|---|---|---|---|
| JP | 2006181831 A | * | 7/2006 |
| WO | 03059599 A1 | | 7/2003 |
| WO | 2017127808 A1 | | 7/2017 |

OTHER PUBLICATIONS

Espacenet Translation of JP-2006181831-A (Year: 2025).*
International Search Report for International Application No. PCT/EP2021/067219, International Filing Date Jun. 23, 2021, Date of Mailing Oct. 5, 2021, 5 pages.
Written Opinion for International Application No. PCT/EP2021/067219, International Filing Date Jun. 23, 2021, Date of Mailing Oct. 5, 2021, 7 pages.

* cited by examiner

*Primary Examiner* — Michael Zhang
(74) *Attorney, Agent, or Firm* — CANTOR COLBURN LLP

(57) ABSTRACT

A multilayer film includes: an inner layer system having a first surface and a second surface; and a first skin layer and a second skin layer bound to the inner layer system at the first and second surfaces respectively. The inner layer system consists of a polymer formulation (A) containing: $\geq 60.0$ and $\leq 90.0$ wt % of a linear low-density polyethylene A; and $\geq 10.0$ and $\leq 40.0$ wt % of a high-density polyethylene having a density of $\geq 940$ and $\leq 970$ kg/m$^3$; and at least one of the first or the second skin layer(s) is a sealing layer comprising a linear low-density polyethylene B comprising polymeric moieties derived from ethylene and 1-octene/1-hexene, having a density of $\geq 890$ and $\leq 915$ kg/m$^3$. The multilayer film is a bi-directionally oriented film and can produce a sealed package having a high sealing strength and improved tensile properties.

14 Claims, No Drawings

BI-DIRECTIONALLY ORIENTED MULTILAYER FILM

CROSS REFERENCE TO RELATED APPLICATIONS

This application is a National Stage application of PCT/EP2021/067219, filed Jun. 23, 2021, which claims the benefit of European Application No. 20184713.4, filed Jul. 8, 2020, both of which are incorporated by reference in their entirety herein.

BACKGROUND

The present invention relates to a bi-directionally oriented multilayer film comprising an ethylene-based polymer. The invention also relates to a process for the production of such film. The invention further relates to the use of such film in packaging applications such as food packaging applications. In particular, the invention relates to films that require certain heat sealability properties.

Films comprising ethylene-based polymers, materials are abundantly used in a wide variety of applications. A particular example where such films find their application is in food packaging. Use of such films allows for packaging of foodstuff products in a very hygienic manner, contributes to preservation of the packaged products for a prolonged period, and can be done in a very economically attractive way. Further, such films can be produced with a highly attractive appearance. Examples of ethylene-based polymers include polyethylene materials or PE.

A particular type of films that may be produced from ethylene-based polymers are biaxially oriented films wherein the orientation is introduced in the solid state, also referred to commonly as bi-directionally oriented films or BO films. BO films are widely used in for example food packaging applications. Such BO films may for example be produced by sequential or simultaneous stretching of a film produced by cast extrusion in both the longitudinal direction, also referred to as machine direction, and the transverse direction of the film. By so, a film can be produced with high modulus and strength, thus enabling down-gauging of the film, which is one of the main drivers in the packaging industry, as it contributes to reduction of weight of the package, and material consumption. In addition, such films are processable reliably at very high processing speeds in packaging lines.

An exemplary description of the production of BO films can for example be found in WO03/059599-A1, describing a method of production of BO films using a so-called tenter frame, wherein the film, subsequent to production via cast extrusion, is subjected to stretching in the machine direction via operation of various rolls that exert a stretching force onto the cast film as a result of the selected speed of the cooperating rolls, and wherein subsequently the film is subjected to an orientation force in the transverse direction.

In many applications of BO films, it is required that the package, after being provided with the contents to be stored in it, is hermetically sealed, in such way that penetration of gases or moisture from the environment into the package is minimised or even eliminated. Commonly, this is achieved by heat sealing of the package. In such process, the remaining opening(s) of the package are subjected to thermal energy, either by direct contact heating or by irradiation, so that the side of the film that constitutes the inner side, thus towards the packaged goods, reaches a temperature at which it becomes sufficiently soft so that, upon applying a contacting pressure and reducing the temperature, a thermoplastic seal is formed that seals the packed contents from the environment.

SUMMARY

There is a demand to ensure that the temperature at which the sealing layer of the film becomes sufficiently soft to allow for production of a seal having sufficient strength is reduced.

This has now been achieved according to the present invention by a multilayer film comprising:

an inner layer system comprising a first surface and a second surface;

a first skin layer bound to the inner layer system at the first surface of the inner layer system; and a second skin layer bound to the inner layer system at the second surface of the inner layer system;

wherein inner layer system consists of a polymer formulation (A) comprising: ≥60.0 and ≤90.0 wt % of a first ethylene-based polymer being a linear low-density polyethylene A (LLDPE A); and ≥10.0 and ≤40.0 wt % of a high-density polyethylene (HDPE) having a density of ≥940 and ≤970 kg/m³, preferably of ≥955 and ≤970 kg/m³, as determined in accordance with ASTM D792 (2008); and at least one or both of the first or the second skin layer(s) is a sealing layer comprising a second ethylene-based polymer being a linear low-density polyethylene B (LLDPE B) comprising polymeric moieties derived from ethylene and from 1-octene or 1-hexene, having a density of ≥890 and ≤915 kg/m³, preferably of ≥900 and ≤915 kg/m³, as determined in accordance with ASTM D792 (2008), preferably wherein the sealing layer comprises ≥70.0 wt % of the second ethylene-based polymer or wherein the sealing layer consists of the second ethylene-based polymer;

wherein the multilayer film is a bi-directionally oriented film wherein the orientation in both directions is introduced in the solid state.

Such film allows for the production of a sealed package having a sufficiently high sealing strength at reduced sealing temperatures, also referred to as the seal initiation temperature, whilst also having improved tensile properties, such as demonstrated by improved tensile modulus in both machine direction as well as in transverse direction, and improved tensile strength, also in both machine direction and in transverse direction. The film according to the invention demonstrates a desirably low sealing temperature whilst being manufactured in a single processing stage, being multilayer biaxial stretching, without need to apply a lamination step to a biaxially oriented film for application of a sealing layer.

Furthermore, the film of the present invention is such that it consists essentially of polyethylene as the polymer material in the film. This is very advantageous as it renders the film particularly suitable for recycling purposes. The film can be understood to be a 'mono-material' film. In commonly applied recycling technologies, one seeks to separate waste polymer products into streams by the nature of the polymers of which the waste product is constituted. As per the art, many multilayer films are composed of layers and compositions involving polymer products of so different nature that they cannot be considered a mono-material product, which decreases the recyclability of the film product, or even may render it unsuitable for recycling. The film of the present invention, however, being a mono-material product, is suitable for processing in recycling processes of various nature, rendering the films particularly suitable for circular use. In the context of the present invention, it is to be understood that where mentioned that the film consists essentially of polyethylene materials as its polymer material, this means that the film comprises at least 90 wt % of polyethylene materials with regard to the total weight of the polymer material in the film, preferably at least 95 wt %.

DETAILED DESCRIPTION

The HDPE may for example have a density of ≥955 and ≤970 kg/m$^3$. The second ethylene-based polymer may for example have a density of ≥895 and ≤915 kg/m$^3$, preferably of ≥900 and ≤915 kg/m$^3$, more preferably of ≥905 and ≤915 kg/m$^3$.

In a certain embodiment of the invention, both the first and the second skin layers are sealing layers comprising the second ethylene-based polymer. Particularly, it is preferred that the sealing layers comprise ≥70.0 wt % of the second ethylene-based polymer. Even more particularly, the sealing layers may consist of the second ethylene-based polymer.

In the case that one of the first or the second skin layer is not a sealing layer, said skin layer may for example comprise or consist of an LLDPE comprising polymeric moieties derived from ethylene and from 1-hexene or 1-octene, having a density of ≥918 and ≤940 kg/m$^3$, preferably of ≥918 and ≤930 kg/m$^3$, more preferably of ≥918 and ≤925 kg/m$^3$, as determined in accordance with ASTM D792 (2008).

In certain particular embodiments of the invention, the second ethylene-based polymer has a melt mass-flow rate of ≥0.5 and ≤5.0 g/10 min, preferably of ≥0.5 and ≤4.0 g/10 min, more preferably of ≥0.5 and ≤2.5 g/10 min, as determined in accordance with ASTM D1238 (2013) at a temperature of 190° C. under a load of 2.16 kg.

The second ethylene-based polymer may for example have a fraction that is eluted in analytical temperature rising elution fractionation (a-TREF) at a temperature ≤30.0° C. of ≤8.0 wt %, preferably ≤5.0 wt %, more preferably ≤3.0 wt %, even more preferably of ≤2.0 wt %, yet even more preferably of ≤1.0 wt %, with regard to the total weight of the second ethylene-based polymer. The second ethylene-based polymer may for example have a fraction eluted in a-TREF at a temperature of >30° C. and <94.0° C. of ≥90.0 wt %, preferably ≥95.0 wt %, more preferably of ≥97.0 wt %, even more preferably of ≥98.0 wt %, with regard to the total weight of the second ethylene-based polymer. The second ethylene-based polymer may for example have a fraction that is eluted in analytical temperature rising elution fractionation (a-TREF) at a temperature ≤30.0° C. of ≤3.0 wt %, and a fraction eluted in a-TREF at a temperature of >30° C. and <94.0° C. of ≥97.0 wt %, with regard to the total weight of the second ethylene-based polymer. The second ethylene-based polymer may for example have a fraction that is eluted in analytical temperature rising elution fractionation (a-TREF) at a temperature ≤30.0° C. of ≤2.0 wt %, and a fraction eluted in a-TREF at a temperature of >30° C. and <94.0° C. of ≥98.0 wt %, with regard to the total weight of the second ethylene-based polymer.

The second ethylene-based polymer may for example comprise ≥5.0 and ≤20.0 wt %, preferably ≥10.0 and ≤20.0 wt %, more preferably ≥10.0 and ≤15.0 wt %, of moieties derived from 1-hexene or 1-octene, with regard to the total weight of the second ethylene-based polymer. The second ethylene-based polymer may for example comprise ≥80.0 and ≤95.0 wt % of moieties derived from ethylene, with regard to the total weight of the second ethylene-based polymer. Preferably, the second ethylene-based polymer consists of ≥80.0 and ≤95.0 wt % of moieties derived from ethylene, and ≥5.0 and ≤20.0 wt % of moieties derived from 1-hexene or 1-octene.

The content and type of comonomer may be determined using 13C Nuclear Magnetic Resonance on a Bruker Avance 500 spectrometer equipped with a cryogenically cooled probe head operating at 125° C., whereby the samples were dissolved at 130° C. in C$_2$D2Cl$_4$ containing DBPC as stabiliser.

The high-density polyethylene that is used in the film according to the present invention may for example have a melt mass-flow rate of ≥0.5 and ≤15.0 g/10 min, preferably of ≥0.5 and ≤10.0 g/10 min, as determined in accordance with ASTM D1238 (2013) at a temperature of 190° C. under a load of 2.16 kg.

It is particularly preferred that the high-density polyethylene is a homopolymer of ethylene.

The inner layer system of the multilayer film of the invention may for example consist of a single layer. Alternatively, the inner layer system may consist of 3, 5 or 7 layers. The inner layer system may for example comprise ≥20.0 and ≤40.0 wt %, preferably ≥20.0 and ≤35.0 wt %, even more preferably ≥20.0 and ≤30.0 wt %, of the HDPE, with regard to the total weight of the inner layer system. The inner layer system preferably consists of a single layer, wherein that single layer comprises ≥10.0 wt % and ≤40.0 wt %, preferably ≥20.0 wt % and ≤40.0 wt %, more preferably ≥20.0 and ≤35.0 wt %, even more preferably ≥20.0 and ≤30.0 wt %, of the HDPE.

The inner layer system may for example comprise ≥60.0 and ≤90.0 wt %, preferably ≥60.0 and ≤80.0 wt %, of an LLDPE A comprising polymeric moieties derived from ethylene and from 1-hexene or 1-octene, preferably of 1-hexene, having a density of ≥918 and <940 kg/m$^3$, preferably of ≥918 and ≤930 kg/m$^3$, more preferably of ≥918 and ≤925 kg/m$^3$, as determined in accordance with ASTM D792 (2008). The LLDPE A that is used in the inner layer system may for example have a melt mass-flow rate of ≥0.5 and ≤5.0 g/10 min, preferably ≥1.0 and ≤3.0 g/10 min.

It is preferred that the linear low-density polyethylene A has:
a density of ≥918 and <940 kg/m$^3$ as determined in accordance with ASTM D792 (2008);
a melt mass-flow rate of ≥0.5 and ≤5.0 g/10 min, as determined in accordance with ASTM D1238 (2013) at a temperature of 190° C. under a load of 2.16 kg;
a fraction that is eluted in analytical temperature rising elution fractionation (a-TREF) at a temperature ≤30.0° C. of ≥3.0 wt %, with regard to the total weight of the LLDPE; and/or
a fraction eluted in a-TREF at a temperature >94.0° C. of ≥20.0 wt %, with regard to the total weight of the LLDPE.

The inner layer system may for example account for ≥60.0 wt % of the total weight of the multilayer film, preferably for ≥70.0 wt %, more preferably for ≥80.0 wt %. The first skin layer may for example account for ≥5.0 and ≤20.0 wt % of the total weight of the multilayer film, preferably for ≥5.0 and ≤15.0 wt %, even more preferably for ≥10.0 and ≤15.0 wt %. The second skin layer may for example account for ≥5.0 and ≤20.0 wt % of the total weight of the multilayer film, preferably for ≥5.0 and ≤15.0 wt %, even more preferably for ≥10.0 and ≤15.0 wt %. For example, the first skin layer may account for ≥5.0 and ≤20.0 wt % of the total weight of the multilayer film, preferably for ≥5.0 and ≤15.0 wt %, even more preferably for ≥10.0 and ≤15.0 wt %, and the second skin layer for ≥5.0 and ≤20.0 wt % of the total weight of the multilayer film, preferably for ≥5.0 and ≤15.0 wt %, even more preferably for ≥10.0 and ≤15.0 wt %.

The inner layer system may for example comprise a quantity of a cavitating agent. A suitable cavitating agent may for example be an inorganic compound, such as a compound selected from a calcium carbonate, a calcium-magnesium carbonate, a silicate, a talc, a hydrated alumina, glass, metal or ceramic beads or spheres, and a kaolin; or a polar polymer, such as a polymer selected from a polybutylene terephthalate, a polyethylene terephthalate, a polyethylene naphthalate, a polycarbonate, a polystyrene, a poly-acrylate, a polyamide, a cross-linked polylactic acid, and an acrylic resin; or rubber particles. The inner layer system may for example comprise ≥5.0 and ≤40.0 wt %, preferably ≥5.0 and ≤25.0 wt %, of such cavitating agent. Preferably, the inner layer system comprises ≤20.0 wt % of a cavitating agent, wherein the cavitating agent is selected from calcium carbonate and a polar polymer. The average particle size of the cavitating agent particles may for example be 0.1 to 10 μm.

The multilayer film may for example have a thickness of ≥5 μm and ≤200 μm, preferably ≥10 μm and ≤75 μm.

The present invention in certain embodiments also relates to a process for production of the multilayer film, wherein the process involves the steps in this order of:

(a) manufacturing an unoriented multilayer film via cast extrusion, the unoriented film comprising an inner layer system comprising a first surface and a second surface;

a first skin layer bound to the inner layer system at the first surface of the inner layer system; and a second skin layer bound to the inner layer system at the second surface of the inner layer system;

wherein the inner layer system consists of a polymer formulation (A) comprising: ≥60.0 and ≤90.0 wt % of a first ethylene-based polymer being a linear low-density polyethylene A (LLDPE A); and ≥10.0 and ≤40.0 wt % of a high-density polyethylene (HDPE) having a density of ≥940 and ≤970 kg/m³, preferably of ≥955 and ≤970 kg/m³, as determined in accordance with ASTM D792 (2008); and at least one or both of the first or the second skin layer(s) is a sealing layer comprising a second ethylene-based polymer being a linear low-density polyethylene B (LLDPE B) comprising polymeric moieties derived from ethylene and from 1-hexene or 1-octene, having a density of ≥890 and ≤915 kg/m³ as determined in accordance with ASTM D792 (2008), preferably wherein the sealing layer comprises ≥70.0 wt % of the second ethylene-based polymer or wherein the sealing layer consists of the second ethylene-based polymer;

(b) subjecting the unoriented film to heat to bring the film to a temperature of >70° C. and <$T_{pm}$ of the first ethylene-based polymer, $T_{pm}$ being determined as peak melting temperature in accordance with ASTM D3418 (2008);

(c) stretching the heated cast film by:

applying a stretching force in the machine direction (MD) to induce a drawing in the machine direction, and subsequently subjecting the obtained film to heat to bring the film to a temperature of between $T_{pm}$–

6

25° C. and $T_{pm}$ of the first ethylene-based polymer, under application of a stretching force in the transverse direction (TD) to induce a drawing in the transverse direction;

or simultaneously applying a stretching force in the MD and the TD to induce a drawing in the MD and the TD;

(d) maintaining the stretching forces and temperature to ensure drawing in TD is maintained to a level of >85% of the drawing in TD as applied; and (e) cooling the stretched film to obtain a bi-directionally oriented film.

It is preferred that the degree of drawing in each of the MD and TD direction is at least 4.5, wherein the degree of drawing is the ratio between the dimension in the corresponding direction before and after the film is subjected to the orientation step in that particular direction.

In a certain embodiment, the invention also relates to a package comprising the multilayer film according to the invention, preferably wherein the package contains foodstuff products.

In certain embodiments of the invention, each of the first and the second skin layers may comprise up to 5.0 wt % of additives, for example anti-block agents, slip agents, UV stabilisers, antioxidants, and processing aids. In certain embodiments, the inner layer system may comprise up to 5.0 wt % of additives, for example antifog agents, pigments, and slip agents.

According to the invention, analytical temperature rising elution fractionation, also referred to as a-TREF, may be carried out using a Polymer Char Crystaf-TREF 300 equipped with stainless steel columns having a length of 15 cm and an internal diameter of 7.8 mm, with a solution containing 4 mg/ml of sample prepared in 1,2-dichloroben-zene stabilised with 1 g/l Topanol CA (1,1,3-tri(3-tert-butyl-4-hydroxy-6-methylphenyl)butane) and 1 g/l Irgafos 168 (tri(2,4-di-tert-butylphenyl) phosphite) at a temperature of 150° C. for 1 hour. The solution may be further stabilised for 45 minutes at 95° C. under continuous stirring at 200 rpm before analyses. For analyses, the solution was crystallised from 95° C. to 30° C. using a cooling rate of 0.1° C./min. Elution may be performed with a heating rate of 1° C./min from 30° C. to 140° C. The set-up may be cleaned at 150° C. The sample injection volume may be 300 μl, and the pump flow rate during elution 0.5 ml/min. The volume between the column and the detector may be 313 μl. The fraction that is eluted at a temperature of ≤30.0° C. may in the context of the present invention be calculated by subtracting the sum of the fraction eluted >30.0° C. from 100%, thus the total of the fraction eluted ≤30.0° C., and the fraction eluted >30.0° C. to add up to 100.0 wt %.

Particularly, a-TREF may be carried out using a Polymer Char Crystaf-TREF 300 using a solution containing 4 mg/ml of the polymer in 1,2-dichlorobenzene, wherein the solution is stabilised with 1 g/l 1,1,3-tri(3-tert-butyl-4-hydroxy-6-methylphenyl)butane and 1 g/l tri(2,4-di-tert-butylphenyl) phosphite) at a temperature of 150° C. for 1 hour, and further stabilised for 45 minutes at 95° C. under continuous stirring at 200 rpm, wherein the prior to analyses the solution is crystallised from 95° C. to 30° C. using a cooling rate of 0.1° C./min, and elution is performed at a heating rate of 1° C./min from 30° C. to 140° C., and wherein the equipment has been cleaned at 150° C.

The fraction that is eluted at a temperature of ≤30° C. may in the context of the present invention be calculated by subtracting the sum of the fraction eluted >94° C. and the fraction eluted >30° C. and ≤94° C. from 100%, thus the total of the fraction eluted ≤30° C., the fraction eluted >30° C. and ≤94° C. and the fraction eluted >94° C. to add up to 100.0 wt %.

In the context of the present invention, the CCDB is determined according to formula I:

$$CCDB = \frac{T_{z+2} - T_{n-2}}{T_{n-2}} * 100 \qquad \text{formula I}$$

wherein $T_{n-2}$ is the moment calculated according to the formula II:

$$T_{n-2} = \frac{\sum \frac{w(i)}{T(i)^2}}{\sum \frac{w(i)}{T(i)^3}} \qquad \text{formula II}$$

and $T_{z+2}$ is the moment calculated according to the formula III:

$$T_{z+2} = \frac{\sum w(i) \cdot T(i)^4}{\sum w(i) \cdot T(i)^3} \qquad \text{formula III}$$

wherein w(i) is the sampled weight fraction in wt % with regard to the total sample weight in a-TREF analysis of a sample (i) taken at temperature T(i), where T(i)>30° C., the area under the a-TREF curve being normalised to surface area=1 for T(i)>30° C.; and T(i) is the temperature at which sample (i) is taken in a-TREF analysis, in ° C.

In the multilayer film of the present invention, the second ethylene-based polymer may for example have a chemical composition distribution broadness (CCDB) of ≥5.0 and ≤25.0, preferably ≥5.0 and ≤12.5 or ≥15.0 and ≤25.0.

In the context of the present invention, a bi-directionally oriented film wherein the orientation in both directions is introduced in the solid state preferably is not a blown film. In a blown film, the orientation is introduced in molten state. It is preferred that the orientation of the film of the present invention is performed at a temperature of at least 10° C. below the melting temperature of the film.

The invention will now be illustrated by the following non-limiting examples.

The following materials were used in the examples according to the present invention:

| HDPE1 | A high-density polyethylene homopolymer with properties as in the table below |
| HDPE2 | A high-density polyethylene homopolymer with properties as in the table below |
| LLDPE1 | SABIC LLDPE BX202, a linear low-density polyethylene |
| LLDPE2 | SABIC SUPEER 8112, a linear low-density polyethylene |

In the table below, key properties of the polyethylene materials are presented.

| Material | HDPE1 | HDPE2 | LLDPE1 | LLDPE2 |
|---|---|---|---|---|
| MFR2 | 0.7 | 8.0 | 2.1 | 1.0 |
| Density | 961 | 967 | 921 | 912 |
| $T_{pm}$ | 134 | 134 | 124 | 108 |
| $T_c$ | 118 | 118 | 111 | 95 |
| Ethylene units content | 100.0 | 100.0 | 89.0 | 88.1 |
| Comonomer units content | 0.0 | 0.0 | 11.0 | 11.9 |
| Comonomer type | 0.0 | 0.0 | C6 | C8 |
| $M_n$ | 9 | 11 | 18 | 32 |
| $M_w$ | 105 | 72 | 109 | 95 |
| $M_z$ | 670 | 324 | 463 | 205 |
| $M_w/M_n$ | 11.3 | 6.3 | 6.0 | 3.0 |
| $M_z/M_w$ | 6.3 | 4.5 | 4.2 | 2.2 |
| $M_z/M_n$ | 74 | 28.4 | 25.4 | 6.4 |
| a-TREF <30 | 0.0 | 0.0 | 13.5 | 0.9 |
| a-TREF 30-94 | 0.0 | 0.0 | 50.9 | 99.1 |
| a-TREF >94 | 100.0 | 100.0 | 35.6 | 0.0 |
| CCDB | | | | 8.6 |

Wherein:

the MFR2 is the melt mass flow rate as determined in accordance with ASTM D1238 (2013) at a temperature of 190° C. under a load of 2.16 kg, expressed in g/10 min;

the density is determined in accordance with ASTM D792 (2008), expressed in kg/m³;

$T_{pm}$ is the peak melting temperature as determined using differential scanning calorimetry (DSC) in accordance with ASTM D3418 (2008), expressed in ° C.;

$T_c$ is the crystallisation temperature as determined using differential scanning calorimetry (DSC) in accordance with ASTM D3418 (2008), expressed in ° C.;

the ethylene units content indicates the weight quantity of units present in the polymer that are derived from ethylene, also referred to as the quantity of moieties derived from ethylene, with regard to the total weight of the polymer, expressed in wt %;

the comonomer content indicates the weight quantity of units present in the polymer that are derived from the comonomer, also referred to as the quantity of moieties derived from the comonomer, with regard to the total weight of the polymer, expressed in wt %;

the comonomer type indicates the type of comonomer used in the production of the polymer, where C6 is 1-hexene and C8 is 1-octene;

the content and type of comonomer were determined using $^{13}C$ Nuclear Magnetic Resonance on a Bruker Avance 500 spectrometer equipped with a cryogenically cooled probe head operating at 125° C., whereby the samples were dissolved at 130° C. in $C_2D_2Cl_4$ containing DBPC as stabiliser;

$M_n$ is the number average molecular weight, $M_w$ is the weight average molecular weight, and $M_z$ is the z-average molecular weight, wherein $M_n$, $M_w$, and $M_z$ are each expressed in kg/mol, and determined in accordance with ASTM D6474 (2012);

a-TREF<30 indicates the fraction of the polymer that is eluted in a-TREF according to the method presented above in the temperature range ≤30.0° C., expressed in wt %, and represents the amorphous fraction of the polymer, calculated by subtracting the a-TREF 30-94 and the a-TREF>94 fraction from 100.0 wt %;

a-TREF 30-94 indicates the fraction of the polymer that is eluted in a-TREF in the temperature range of >30.0 and ≤94.0° C., expressed in wt %, and represents the branched fraction of the polymer;

a-TREF>94 indicates the fraction of the polymer that is eluted in a-TREF in the temperature range of >94.0 and <140° C., expressed in wt %, and represents the linear fraction of the polymer;

the CCDB is the chemical composition distribution broadness calculated according to the method described herein above.

The a-TREF analyses were carried out using a Polymer Char Crystaf TREF 300 device using a solution containing 4 mg/ml of sample in 1,2-dichlorobenzene stabilised with 1 g/l Topanol CA (1,1,3-tri(3-tert-butyl-4-hydroxy-6-methylphenyl)butane) and 1 g/l Irgafos 168 (tri(2,4-di-tert-butylophenyl)phosphite) at a temperature of 150° C. for 1 hour. The solution was further stabilised for 45 minutes at 95° C. under continuous stirring at 200 rpm before analyses. For analyses, the solution was crystallised from 95° C. to 30° C. using a cooling rate of 0.1° C./min. Elution was performed with a heating rate of 1° C./min from 30° C. to 140° C. The set-up was cleaned at 150° C.

Using the above polymers, five-layer and three-layer bi-directionally oriented films were produced. The bi-directionally oriented films were produced using a cast film production line with subsequent tenter frame type sequential biaxial orientation.

For the experiments CE1 (comparative) and E1 and E2 according to the invention, a set-up comprising five melt extruders was used, where an extruder A supplied material for a first skin layer A, an extruder B supplied material the first intermediate layer B, an extruder C supplied material for the inner layer C, an extruder D supplied material for the second intermediate layer D, and an extruder E supplied the material for the second skin layer E. The extruders were positioned such that the molten material was forced through a t-shaped die with a die gap of 3.0 mm, so that the arrangement of the layers in the obtained cast film was A/B/C/D/E. Each of the extruders was operated such to supply molten polymer material at a temperature of 240° C. The total throughput was 100 kg/h. the five-layer cast film was cooled onto a chill roll to a temperature of between 25° C. and 50° C. After cooling, the film was stretched in the machine direction via a set of rolls for pre-heating at 40° C. to 100° C., to introduce a drawing ratio of 5.0 in the machine direction, followed by an annealing step at 95° C. Subsequently, the film was draw in the transverse direction with a draw ratio of 10.0 in a drawing oven, operated at temperatures of 140° C. at the beginning of the oven to 100° C. at the end of the oven. The layer A was subjected to a corona treatment of 25 W·min/m². A biaxially oriented five-layer film having a thickness of 18 μm was obtained.

For the example E3 according to the invention, a set-up comprising three melt extruders was used, where an extruder A supplied material for a first skin layer A, an extruder C supplied material for inner layer C, and an extruder E supplied the material for the second skin layer E. The extruders were positioned such that the molten material was forced through a t-shaped die, so that the arrangement of the layers in the obtained cast film was A/C/E. Each of the extruders was operated such to supply molten polymer material at a temperature of 250° C. The throughput was 135 kg/h. The film as extruded through the t-shaped die was cast onto a chill roll to a temperature of 30° C. to form a cast film. The chilled cast film was subjected to stretching in the machine direction using a set of stretching rolls at a temperature of 88-100° C., followed by an annealing at 95° C., to induce a degree of stretching in the machine direction of 5.5.

Subsequently, the film was stretched in the transverse direction to a degree of stretching of 7 by subjecting the film to heat whilst applying a stretching force, wherein the film was passed through an oven through which the film was continuously transported, wherein the temperature was 152° C. at the entering zone of the oven, decreasing to 110° C. towards the exit of the oven. The layer A was subsequently subjected to a corona treatment of 25 W·min/m². A biaxially oriented three-layer film having a thickness of 24 μm was obtained.

The composition of the experimental films is presented in the table below. The skin layers A and E in all examples contained 3.0 wt % antiblock agent CON-X AB 664 and 5.0 wt % slip agent CON-X SL 577, both available from Constab Polyolefin Additives GmbH.

| Example | Layer | Material composition | Layer weight |
|---|---|---|---|
| E1 | A | 92.0% LLDPE1 | 7.0 |
| | B | 100.0% LLDPE1 | 8.0 |
| | C | 75.0% LLDPE1, 25.0% HDPE2 | 70.0 |
| | D | 100.0% LLDPE1 | 8.0 |
| | E | 92.0% LLDPE2 | 7.0 |
| E2 | A | 92.0% LLDPE1 | 7.0 |
| | B | 100.0% LLDPE1 | 8.0 |
| | C | 75.0% LLDPE1, 25.0% HDPE1 | 70.0 |
| | D | 100.0% LLDPE1 | 8.0 |
| | E | 92.0% LLDPE2 | 7.0 |
| CE1 | A | 92.0% LLDPE1 | 7.0 |
| | B | 100.0% LLDPE1 | 8.0 |
| | C | 75.0% LLDPE1, 25.0% HDPE2 | 70.0 |
| | D | 100.0% LLDPE1 | 8.0 |
| | E | 92.0% LLDPE1 | 7.0 |
| E3 | A | 92.0% LLDPE1 | 10.0 |
| | C | 60.0% LLDPE1, 40.0% HDPE2 | 80.0 |
| | E | 92.0% LLDPE2 | 10.0 |

Wherein the percentage in the material composition relates to the quantity of the particular material, in wt % with regard to the total weight of the material of that given layer, and wherein the layer weight indicates the percentage of the weight of the given layer with regard to the total weight of the given experimental film. In the above table, examples E1-E3 are according to the invention, CE1 is comparative.

Of the thus obtained films, a set of properties were determined as indicated in the table below.

| Example | E1 | E2 | E3 | CE1 |
|---|---|---|---|---|
| Haze | 6.1 | 5.9 | 14.8 | 12.6 |
| TM-MD | 667 | 768 | 646 | 665 |
| TM-TD | 1257 | 1447 | 855 | 1617 |
| TS-MD | 64 | 47 | 86 | 89 |
| TS-TD | 210 | 247 | 73 | 214 |
| EL-MD | 294 | 272 | 256 | 246 |
| EL-TD | 31 | 30 | 112 | 24 |

Wherein

Haze is determined in accordance with ASTM D1003 (2013), expressed in %;

TM is the tensile modulus, determined in the machine direction (MD) and transverse direction (TD) of the film, expressed in MPa, determined as 1% secant modulus in accordance with ASTM D882-18, using an initial sample length of 250 mm and a testing speed of 25 mm/min, at room temperature, using preload of 1 N;

TS is the tensile strength at break as determined in accordance with ASTM D882-18, in both machine direction (MD) and in transverse direction (TD), expressed in MPa, determined at room temperature using an initial sample length of 50 mm and a testing speed of 500 mm/min;

EL is the elongation at break as determined in accordance with ASTM D882-18, in both machine direction (MD) and in transverse direction (TD), expressed in MPa, determined at room temperature using an initial sample length of 50 mm and a testing speed of 500 mm/min:

Furthermore, a number of sealing properties were determined as set out below.

The heat seal strength was determined in accordance with ASTM F88 (2015), using method A, on specimens of 15 mm width. Fin-seals were prepared according ASTM F2029 at different temperatures. Two samples of the same film were compressed together, with layer E of the first film sample contacting layer E of the second film sample. Seals were produced by applying a force of 3.0 bar for 1.0 sec, wherein the films were protected with a 25 μm cellophane sheet. The press used for preparing the seal was heated to various temperatures to identify the strength of the seal when produced at different temperatures. By variation of the press temperature, the seal initiation temperature, which is the lowest temperature at which a seal having a strength of at least 0.5 N/10 mm is obtained, was determined.

The seal strength was tested using a tensile testing machine with a testing speed of 200 mm/min, and a grip distance of 10 mm. The maximum load was recorded as the seal strength.

The results of seal strength testing of films of the various above examples, sealed at varying temperatures, are presented in the table below.

| | | Seal strength at | | | | | |
|---|---|---|---|---|---|---|---|
| Example | SIT | 80°C | 90° C. | 100° C. | 110° C. | 120° C. | 130° C. |
| E1 | 94° C. | 0.01 | 0.05 | 1.89 | 9.70 | 8.73 | 10.40 |
| E2 | 92° C. | 0.01 | 0.06 | 4.70 | 7.69 | 10.17 | 9.13 |
| E3 | 92° C. | 0.06 | 0.27 | 3.09 | 3.69 | 4.01 | 12.12 |
| CE1 | 108° C. | 0.06 | 0.30 | 0.45 | 3.76 | 7.24 | 7.46 |

In this table, the SIT represents the seal initiation temperature, which is to be understood to be the lowest temperature at which a seal strength of 0.5 N/10 mm was obtained. The seal strength is expressed in N/15 mm width.

Further, the hot tack strength of the films was determined. Determination thereof was conducted in accordance with ASTM F1921, method B on 15 mm width specimens, with layer E against layer E. The seal pressure was 0.3 N/mm², and the dwell time 1.0 sec. The delay time was 300 ms and the clamp separation rate was 200 mm/s. The hot tack strength is expressed in N/15 mm width.

| | Hot tack strength at | | | | | |
|---|---|---|---|---|---|---|
| Example | 80° C. | 90° C. | 100° C. | 110° C. | 120° C. | 130° C. |
| E3 | 0.03 | 0.49 | 1.52 | 2.98 | 2.12 | 0.80 |
| CE1 | 0.05 | 0.06 | 0.10 | 0.11 | 0.26 | 0.05 |

The invention claimed is:

1. A multilayer film comprising:
an inner layer system comprising a first surface and a second surface;
a first skin layer bound to the inner layer system at the first surface of the inner layer system; and a second skin layer bound to the inner layer system at the second surface of the inner layer system;
wherein
the inner layer system consists of a polymer formulation (A) comprising: ≥60.0 and ≤90.0 wt % of a first ethylene-based polymer being a linear low-density polyethylene A (LLDPE A); and ≥10.0 and ≤40.0 wt %, of a high-density polyethylene (HDPE) having a density of ≥940 and ≤970 kg/m³, as determined in accordance with ASTM D792 (2008); and
at least one or both of the first or the second skin layer(s) is a sealing layer comprising a second ethylene-based polymer being a linear low-density polyethylene B (LLDPE B) comprising polymeric moieties derived from ethylene and from 1-hexene or 1-octene, having a density of ≥890 and ≤915 kg/m³, as determined in accordance with ASTM D792 (2008);
wherein the multilayer film is a bi-directionally oriented film wherein the orientation in both directions is introduced in the solid state,
wherein the second ethylene-based polymer has:
a melt mass-flow rate of ≤0.5 and ≤5.0 g/10 min, as determined in accordance with ASTM D1238 (2013) at a temperature of 190° C. under a load of 2.16 kg;
a fraction that is eluted in analytical temperature rising elution fractionation (a-TREF) at a temperature ≤30.0° C. of ≤8.0 wt %, with regard to the total weight of the second ethylene-based polymer;
a fraction eluted in a-TREF at a temperature of >30° C. and <94.0° C. of ≥90.0 wt %, with regard to the total weight of the second ethylene-based polymer; and/or
a chemical composition distribution broadness (CCDB) of ≥5.0 and ≤25.0.

2. A multilayer film comprising:
an inner layer system comprising a first surface and a second surface;
a first skin layer bound to the inner layer system at the first surface of the inner layer system; and
a second skin layer bound to the inner layer system at the second surface of the inner layer system;
wherein
the inner layer system consists of a polymer formulation (A) comprising: ≥60.0 and ≤90.0 wt % of a first ethylene-based polymer being a linear low-density polyethylene A (LLDPE A); and ≥10.0 and ≤40.0 wt %, of a high-density polyethylene (HDPE) having a density of ≥940 and ≤970 kg/m³, as determined in accordance with ASTM D792 (2008); and
at least one or both of the first or the second skin layer(s) is a sealing layer comprising a second ethylene-based polymer being a linear low-density polyethylene B (LLDPE B) comprising polymeric moieties derived from ethylene and from 1-hexene or 1-octene, having a density of ≥890 and ≤915 kg/m³, as determined in accordance with ASTM D792 (2008);
wherein the multilayer film is a bi-directionally oriented film wherein the orientation in both directions is introduced in the solid state, wherein the linear low-density polyethylene A has:
a density of ≥918 and <940 kg/m³ as determined in accordance with ASTM D792 (2008);

a melt mass-flow rate of ≥0.5 and ≤5.0 g/10 min, as determined in accordance with ASTM D1238 (2013) at a temperature of 190° C. under a load of 2.16 kg;

a fraction that is eluted in analytical temperature rising elution fractionation (a-TREF) at a temperature ≤30.0° C. of ≥3.0 wt %, with regard to the total weight of the LLDPE; and/or a fraction eluted in a-TREF at a temperature ≥94.0° C. of ≥20.0 wt %, with regard to the total weight of the LLDPE.

3. The multilayer film according to claim 1, wherein both the first and the second skin layers are sealing layers comprising the second ethylene-based polymer, or wherein the sealing layers consist of the second ethylene-based polymer.

4. The multilayer film according to claim 1, wherein, in the case that one of the first or the second skin layer is not a sealing layer, said skin layer comprises an LLDPE comprising polymeric moieties derived from ethylene and from 1-hexene or 1-octene, having a density of ≥918 and ≤940 kg/m³ as determined in accordance with ASTM D792 (2008).

5. The multilayer film according to claim 1, wherein the high-density polyethylene has a melt mass-flow rate of ≥0.5 and ≤10.0 g/10 min, as determined in accordance with ASTM D1238 (2013) at a temperature of 190° C. under a load of 2.16 kg.

6. The multilayer film according to claim 1, wherein the second ethylene-based polymer comprises ≥5.0 and ≤20.0 wt % of moieties derived from 1-hexene or 1-octene, with regard to the total weight of the second ethylene-based polymer.

7. The multilayer film according to claim 1, wherein the second ethylene-based polymer comprises ≥80.0 and ≤95.0 wt % of moieties derived from ethylene, with regard to the total weight of the second ethylene-based polymer.

8. The multilayer film according to claim 1, wherein the high-density polyethylene is a homopolymer of ethylene.

9. The multilayer film according to claim 1, wherein the inner layer system consists of a single layer, or wherein the inner layer system consists of 3, 5 or 7 layers.

10. The multilayer film according to claim 1, wherein the inner layer system comprises ≤20.0 wt % of a cavitating agent.

11. The multilayer film according to claim 1, wherein the film has a thickness of ≥5 μm and ≤200 μm.

12. The multilayer film according to claim 1, wherein the sealing layer comprises ≥70.0 wt % of the second ethylene-based polymer.

13. The multilayer film according to claim 1, wherein the sealing layer consists of the second ethylene-based polymer.

14. A package comprising the multilayer film according to claim 1.

* * * * *